(12) United States Patent
Travis et al.

(10) Patent No.: US 8,029,181 B2
(45) Date of Patent: Oct. 4, 2011

(54) LIGHT COLLECTOR FOR AN ILLUMINATION OPTIC

(75) Inventors: Adrian Travis, Seattle, WA (US);
Timothy Large, Bellevue, WA (US);
Neil Emerton, Redmond, WA (US);
Steven Bathiche, Kirkland, WA (US);
Glen C. Larsen, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 12/948,627

(22) Filed: Nov. 17, 2010

(65) Prior Publication Data

US 2011/0050580 A1 Mar. 3, 2011

Related U.S. Application Data

(63) Continuation of application No. 12/651,960, filed on Jan. 4, 2010.

(60) Provisional application No. 61/236,043, filed on Aug. 21, 2009.

(51) Int. Cl.
*F21V 33/00* (2006.01)
(52) U.S. Cl. ............ 362/612; 362/558; 362/600
(58) Field of Classification Search ......... 362/612, 362/613, 608, 558, 311.02
See application file for complete search history.

(56) References Cited

U.S. PATENT DOCUMENTS

| | | | | |
|---|---|---|---|---|
| 6,443,583 | B1 * | 9/2002 | Ha | 362/608 |
| 7,178,942 | B2 * | 2/2007 | Chen et al. | 362/231 |
| 2007/0081329 | A1 * | 4/2007 | Chua et al. | 362/231 |
| 2008/0049445 | A1 | 2/2008 | Harberts et al. | |
| 2008/0309217 | A1 | 12/2008 | Mulder et al. | |

FOREIGN PATENT DOCUMENTS

| | | |
|---|---|---|
| JP | 3147750 U9 | 12/2008 |
| KR | 1020030064258 A | 7/2003 |
| KR | 1020040020017 A | 3/2004 |

OTHER PUBLICATIONS

"Light Guide Techniques Using LED Lamps," Application Brief 1-003, Retrieved at <<http://www.ciri.org.nz/downloads/Lightpipe%20design.pdf>>, Copyright @ 2001 Agilent Technologies, Inc., Dec. 7, 2001, pp. 1-22.
ISA Korean Intellectual Property Office, International Search Report of PCT/US2010/045675, Mar. 1, 2011, 8 Pages.

* cited by examiner

*Primary Examiner* — Laura Tso
(74) *Attorney, Agent, or Firm* — Alleman Hall McCoy Russell & Tuttle LLP

(57) ABSTRACT

A light collector is provided to converge light from a light source down to a range of acceptance angles of an illumination optic, and to couple the converged light into the illumination optic, where the range of acceptance angles of the illumination optic is less than a range of emission angles of the light source.

20 Claims, 5 Drawing Sheets

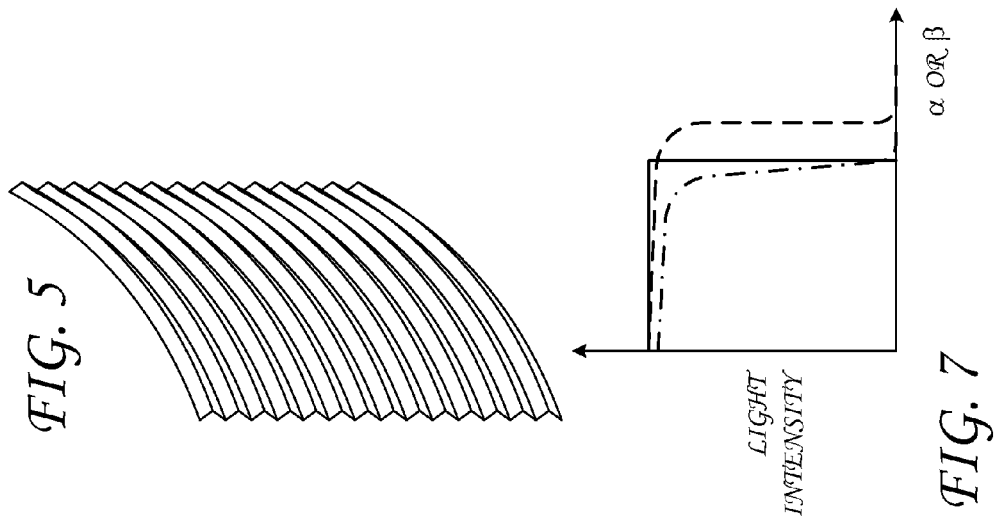
FIG. 5
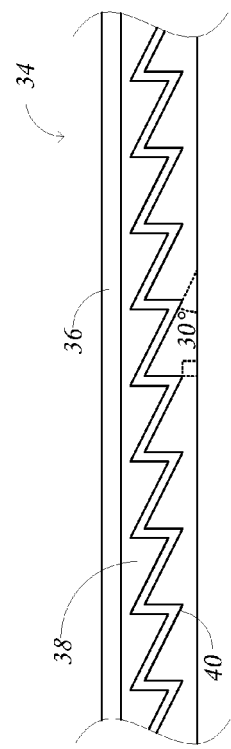
FIG. 7
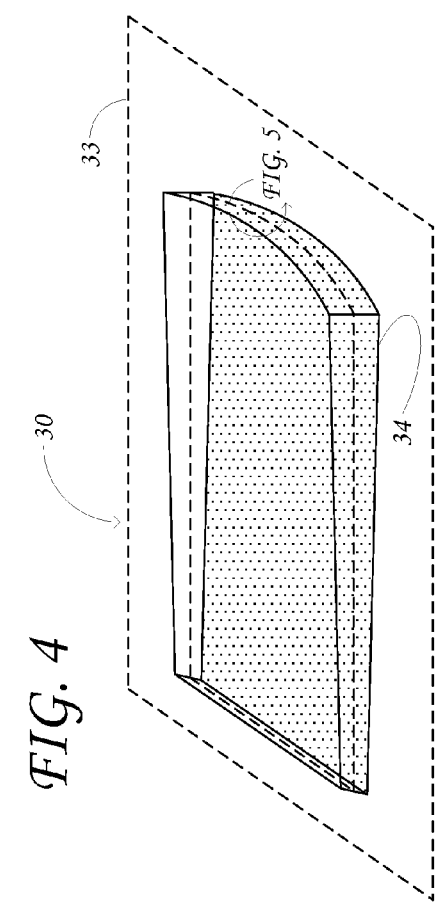
FIG. 4
FIG. 6

LIGHT COLLECTOR FOR AN ILLUMINATION OPTIC

CROSS-REFERENCE TO RELATED APPLICATIONS

This application is a continuation of U.S. patent application Ser. No. 12/651,960, filed Jan. 4, 2010 and entitled LIGHT COLLECTOR FOR AN ILLUMINATION OPTIC, which claims priority to U.S. Provisional Application 61/236,043, filed on Aug. 21, 2009 and entitled LIGHT INPUT CONCENTRATOR, the entirety of both of which are hereby incorporated by reference herein for all purposes.

BACKGROUND

For presenting information visually, a computer display may include an optical system. A computer input device may also include an optical system for detecting user input. In various ways, computer display and input devices have been integrated in the form of multifunction components. One such example is an optical touch-screen, where user input is detected optically and is guided by context-dependent graphics appearing on the screen.

In some cases, practical construction of relatively small-footprint optical systems for display and/or input devices presents a challenge because of the stiff dimensional constraints inherent therein. The light-guiding approaches of traditional optical engineering may, in these devices, be difficult to scale down to provide satisfactory display quality or input functionality.

SUMMARY

A light collector is provided to converge light from a light source down to a range of acceptance angles of an illumination optic, and to couple the converged light into the illumination optic, where the range of acceptance angles of the illumination optic is less than a range of emission angles of the light source.

It will be understood that the summary above is provided to introduce in simplified form a selection of concepts that are further described in the detailed description, which follows. It is not meant to identify key or essential features of the claimed subject matter, the scope of which is defined by the claims that follow the detailed description. Further, the claimed subject matter is not limited to implementations that solve any disadvantages noted above or in any part of this disclosure.

BRIEF DESCRIPTION OF THE DRAWINGS

FIG. 4 is a perspective view showing aspects of an illumination optic in accordance with an embodiment of the present disclosure.

FIG. 5 is a perspective view showing the taller edge face of an illumination optic in accordance with an embodiment of the present disclosure.

FIG. 6 schematically shows a portion of a turning layer of an illumination optic in accordance with an embodiment of the present disclosure.

FIG. 7 shows hypothetical plots of irradiance intensity as a function of incidence angle for three different scenarios in accordance with an embodiment of the present disclosure.

DETAILED DESCRIPTION

The subject matter of the present disclosure is now described by way of example and with reference to certain illustrated embodiments. Components that may be substantially the same in one or more embodiments are identified coordinately and are described with minimal repetition. It will be noted, however, that components identified coordinately in different embodiments may be at least partly different. It will be further noted that the drawings included in this disclosure are schematic. Views of the illustrated embodiments are not necessarily drawn to scale, and aspect ratios, feature size, and numbers of features may be purposely distorted to make selected features or relationships easier to see.

Figure 1:
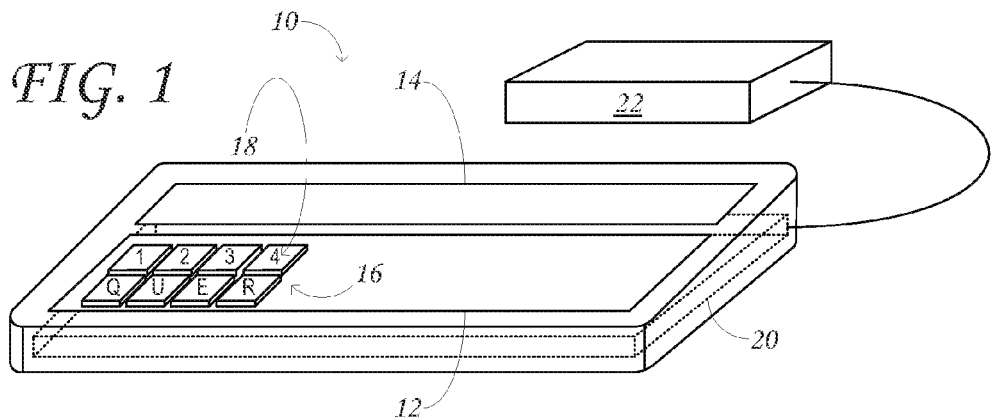
FIG. 1 schematically shows an input device in accordance with an embodiment of the present disclosure.

FIG. 1 schematically shows input device 10 in one example embodiment. The input device may be configured to accept user input in any suitable manner—via one or more mechanical keys, touch-sensitive input areas, and/or mousing areas, for example. Further, the input device may present graphical information to guide the user input, e.g., to indicate to the user that pressing down and/or touching a particular area will result in a particular input. Accordingly, the input device may have alphanumeric characters painted on one or more mechanical keys. In some embodiments, however, at least some of the graphical information used to guide user input may be present in the form of changeable, context-dependent images rendered on one or more image areas of the input device. In FIG. 1, for instance, input device 10 includes first image area 12 and second image area 14. The first image area extends over a set of depressible keys 16 onto which changeable keyface images 18 may be projected from below. The changeable keyface images may indicate to a user the current, context-dependent result of pressing a particular key.

In one embodiment, second image area 14 may be a display-only area of input device 10. From below the second image area, various images may be projected to provide information to the user. In another embodiment, the second image area may include at least some input functionality; it may be a resistive, capacitive, or optically based touch-sensitive area, for example. Accordingly, the images provided in the second image area may be presented to guide user input substantially as described for first image area 12.

To project the various context-dependent, input-guiding images onto the first and second image areas, input device 10 includes optical system 20. The optical system may be arranged below one or more of first image area 12 and second image area 14 to project context-dependent, input-guiding images thereon. In the illustrated embodiment, the optical system is operatively coupled to computer 22, which is configured to provide context-dependent image data to the optical system. Although shown in FIG. 1 as a separate box distinct from the input device, the computer may in other embodiments be coupled within the input device, or vice versa.

Naturally, computer 22 may be operatively coupled to other components of input device 10 and configured to receive input data from the input device. Accordingly, the computer may be configured to determine the state of various mechanical key switches of the input device, to interrogate a touch-sensitive input area and/or a mousing area of the input device, etc.

Figure 2:
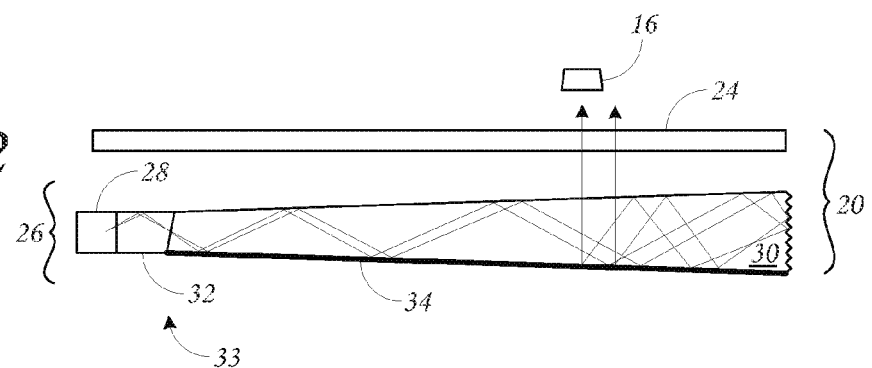
FIGS. 2 and 3 are schematic, cross-sectional views showing aspects of an optical system in accordance with an embodiment of the present disclosure.
Figure 3:
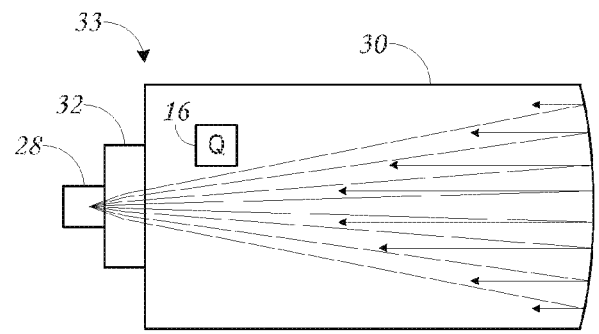

FIGS. 2 and 3 are schematic, cross-sectional views showing aspects of optical system 20 in one example embodiment. These drawings show mechanical key 16 receiving a projected image from the optical system, which includes image-modulating layer 24 and backlight 26. The image-modulating layer may be any display component configured to receive light from the backlight and to selectively transmit one or more images to the first or second image areas of input device 10. In one embodiment, the image-modulating layer may comprise a liquid-crystal display (LCD) control layer—a two-dimensional array of light-gating elements configured to spatially and temporally modulate the intensity of light from the backlight. In one embodiment, the light-gating elements may be polarizing LCD elements coupled to red, green, and blue transmissive windows. In one embodiment, the image-modulating layer may be operatively coupled to computer 22 and configured to receive suitable, context-dependent image data therefrom.

In the embodiment illustrated in FIGS. 2 and 3, backlight 26 includes light source 28, illumination optic 30, and light collector 32. The light source may comprise any compact, visible light emitter—a low-profile lamp, arc, discharge, and/or fluorescent light emitter, for example. In some embodiments, however, the light source may comprise one or more light-emitting diodes (LED's). Each of the LED's in the light source may emit a band of visible light—red, green, or blue light, or white light, for example. Accordingly, one or more LED's may be configured to provide substantially white light suitable for illuminating a conventional, color LCD control layer.

Illumination optic 30 may be any suitable optic configured to admit light, and, for light admitted within a range of acceptance angles, to turn and collimate the admitted light, and to project the turned, collimated, admitted light from an exit face. The illumination optic may be formed from any suitable material transmissive over the desired wavelength range—e.g., the range of wavelengths emitted by light source 28. Suitable materials include glass, acrylic, and polycarbonate, as examples. As shown in FIGS. 2 and 3, illumination optic 30 may comprise a substantially wedge-shaped optic having planar and opposing upper and lower faces. Together, the upper and lower faces define a wedge angle of the optic, which may be zero to one degree in some examples. In one particular embodiment, the wedge angle may be 0.82 degrees. Opposing shorter and taller edge faces are arranged adjacent the upper and lower faces. Through the shorter edge face, divergent light originating at light source 28 is coupled into the illumination optic and fans out toward the taller edge face. The taller edge face functions as a collimating reflector, reflecting light back towards the shorter edge face. Between the shorter and taller edge faces, light propagates through the illumination optic via total internal reflection (TIR), and in a controlled manner, escapes the illumination optic due to carefully controlled violation of the TIR condition. In the following paragraphs, an illumination optic more particularly configured to provide such functionality is described by way of example. It will be understood, however, that illumination optics of various other configurations are equally consistent with the present disclosure.

In one embodiment, the shorter edge face of illumination optic 30 is substantially planar and is oriented obliquely with respect to the upper and lower faces. The taller edge face may be approximately twice the height of the shorter edge face; it may be silvered or may otherwise support a broadband reflective coating. In FIG. 2, an imaginary, horizontal bisection plane reflects the upper face of the illumination optic onto the lower face. Accordingly, the view shown in FIG. 3 may be a cross section of optical system 20 in the bisection plane. In this and other horizontal planes, the taller edge face may be arc-shaped in cross section, having a radius of curvature approximately twice the length of the illumination optic. This configuration causes divergent light originating at light source 28 to be reflected back to the shorter edge face along paths that, when projected onto a horizontal plane, are substantially collimated. To provide collimation with respect to a vertical plane (i.e., the viewing plane of FIG. 2), the taller edge face of the illumination optic may be faceted to yield a Fresnel-type reflector. In particular, an array of substantially planar facets may run horizontally along the taller edge face. The facets may support the reflective coating referred to above.

FIG. 4 is a perspective view of illumination optic 30 in one embodiment, and FIG. 5 provides a magnified, somewhat schematic view of the taller edge face of the illumination optic, showing the Fresnel-type reflector. FIG. 4 also shows, at 33, the imaginary horizontal bisection plane referred to herein.

Returning now to FIGS. 2 and 3, the collimated light may undergo multiple reflections at the opposing upper and lower faces of illumination optic 30 en route back toward the shorter edge face. Due to the wedge shape of the illumination optic, each successive reflection of a given light ray reduces the angle of incidence for the subsequent reflection. As a result, each light ray will eventually encounter one of the opposing upper and lower faces at a subcritical incidence angle and be refracted out of the illumination optic. To redirect this light upward to image-modulating layer 24, the lower face of the illumination optic supports turning layer 34. The turning layer causes light refracting out of the illumination optic to be reflected back through the illumination optic at a very shallow exit angle, e.g., substantially normal to horizontal bisection plane 33. In this manner, light that couples into the illumination optic over an appropriate range of incidence angles may be projected upward, providing backlighting for the image-modulating layer.

FIG. 6 shows turning layer 34 in one example embodiment. The turning layer may comprise a low-refractive index cladding layer 36 affixed and optically coupled to the lower face of illumination optic 30. The cladding layer ensures that most of the light escapes the lower face of the illumination optic—i.e., the face bonded to the turning layer, instead of the upper face. Arranged on the opposite side of the cladding layer is turning film 38. In one embodiment, the turning film may comprise an array of mirrored features 40.

In general, the range of acceptance angles for illumination optic 30 (i.e., the range of incidence angles over which light will couple into the optic and propagate therein by TIR) is determined partly by the refractive index of the material from which the illumination optic is formed and partly by the dimensions of the illumination optic. Such a range may be characterized by a pair of extreme ray angles ($\alpha$, $\beta$). Here, $\alpha$ may define the extreme ray angle projected into horizontal bisection plane 33, the angle measured normal to the intersection of the shorter edge face and the horizontal bisection plane; β may define the extreme ray angle projected into a plane perpendicular to the horizontal bisection plane and to the shorter edge face, the angle measured relative to the horizontal bisection plane. Extreme ray angles α and β may correspond to angles where the coupling efficiency is decreasing or has decreased significantly—to 50 percent, for example. In one embodiment, where the refractive index of the illumination optic is 1.49 and where the illumination optic is 320 millimeters long by 189 millimeters wide, α may be 17.22 degrees, and β may be 11.60 degrees. Thus, α and β may be unequal; in some embodiments, however, α and β may be equal.

In an ideal configuration, light source 28 would be chosen to provide a constant flux of light over the entire range of acceptance angles of illumination optic 30, and to provide no light outside the range of acceptance angles. To illustrate, an idealized irradiance profile as a function of incidence angle is represented in FIG. 7 by the solid line. In principle, admitting light into the illumination optic at incidence angles greater than the range of acceptance angles may be disadvantageous. Such light cannot be directed to the image-modulating layer to provide illumination; instead, it will be refracted out of the illumination optic and may cause undesirable reflections within optical system 20. Nevertheless, various otherwise suitable light sources are naturally configured to emit light of a range of emission angles greater than the range of acceptance angles of the illumination optic. For example, a white-light LED source as described above may emit according to a Lambertian intensity profile—e.g., a substantially constant luminance over a solid angle of ~3.1 steradians.

Therefore, returning now to FIGS. 2 and 3, backlight 26 includes light collector 32. The light collector may be any optic configured to converge (e.g., to angularly converge) light from the light source 28 down to the range of acceptance angles of illumination optic 30, and to couple the converged light into the illumination optic. In this manner, the light collector may transform the irradiance profile of the light source into one that more closely matches the range of acceptance angles of the illumination optic.

Figure 8:
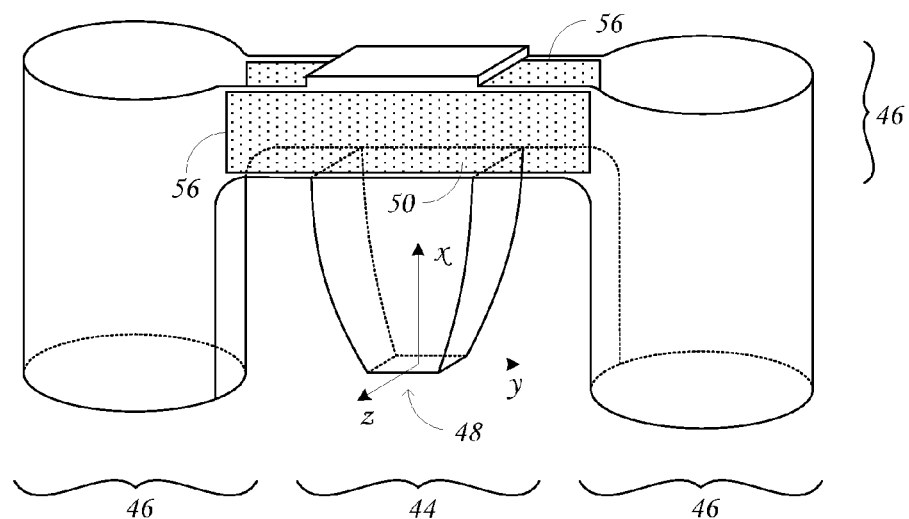
FIG. 8 somewhat schematically shows a light collector in accordance with an embodiment of the present disclosure.
Figure 9:
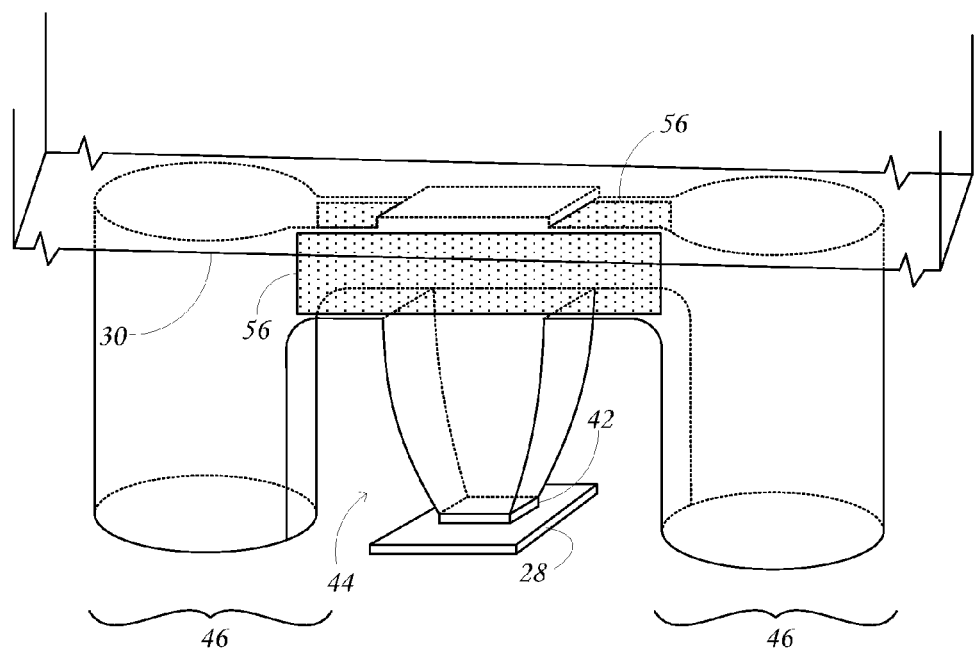
FIG. 9 somewhat schematically shows the light collector embodiment of FIG. 8 arranged between an illumination optic and a light source in accordance with an embodiment of the present disclosure.

FIG. 8 shows light collector 32 in one example embodiment. FIG. 9 shows the same light collector arranged between illumination optic 30 and light source 28, which in the illustrated embodiment comprises a thin, rectangular, emissive layer 42. The light collector may be formed from any suitable material, including the materials identified above as suitable for illumination optic 30. In one embodiment, the light source may be mechanically and/or optically coupled to the light collector via a substantially rectangular contacting area. The contacting area may coincide with the emissive area of the light source, for example.

In one embodiment, light collector 32 may be a discrete component of optical system 20. In other embodiments, the light collector may be integrated into some other component of the optical system. For instance, the light collector may be part of illumination optic 30—formed from the same polymer monolith, for example. In one embodiment, the light collector and the illumination optic may share a common, continuous material phase. In other embodiments, a separately formed light collector may be joined to the illumination optic via one or more thin, optically transparent films 33. Further, at least one of the films 33 joining the light collector to the illumination optic may be configured to suppress reflection; it may comprise an interference and/or dichroic coating, for example. In another embodiment, the light collector may be coupled to the illumination optic via an optically transparent, index-matched gel.

In the embodiment shown in FIG. 8, light collector 32 comprises a collection region 44 and an abutment region 46 integrated into one, seamless structure. This configuration may provide certain manufacturing advantages in embodiments where the light collector is formed via injection molding. It may also enable more accurate positioning of the light collector with respect to illumination optic 30.

Structurally, collection region 44 comprises a solid body having six smooth faces. Entry aperture 48 is disposed on one of the faces, and exit aperture 50 is disposed on the opposite face. Accordingly, light collector 32 may be arranged with the collection region and aligned to accept light from light source 28, through the entry aperture, and to project light onto illumination optic 30, through the exit aperture. In the illustrated embodiment, the light projected through the exit aperture is transmitted through a bridging section of abutment region 46 en route to the illumination optic.

For ease of further description, it is convenient to make reference to a Cartesian coordinate system fixedly oriented with respect to light collector 32 and illumination optic 30. In the coordinate system used herein, the z axis is aligned with the direction of illumination from the illumination optic, normal to horizontal bisection plane 33; the x axis is aligned with the longer dimension of the illumination optic in the horizontal bisection plane; and the y axis is aligned with the shorter dimension of the illumination optic in the horizontal bisection plane. Thus, the xy plane is the same as horizontal bisection plane 33. The origin of the coordinate system is taken as the center point of emissive area 42 of light source 28, and the 'mechanical axis' of the optical system is taken to be the positive x axis.

With reference to the coordinate system defined above, additional features of collection region 44 are now described. In general, four faces adjacent to entry aperture 48 and exit aperture 50 are configured to converge the light entering the entry aperture via TIR, and to reflect the converged light out of the exit aperture within the range of acceptance angles of illumination optic 30. In particular, the collection region may comprise a first minor-image pair of opposing, faces aligned parallel to the xy plane, and configured to converge the light from light source 28 to angles less than α. The collection region may further comprise a second minor-image pair of opposing faces aligned parallel to the xz plane, and configured to converge the light from the light source to angles less than β. To provide the desired convergence, each face of the first and second minor-image pairs of opposing faces may be curved—e.g., curved parabolically. However, at least one pair of faces may also include a planar region interrupting the otherwise curved regions, as further described below.

To describe the structure of collection region 44 mathematically, it is convenient to begin with two plane figures—a first plane figure drawn in the xy plane, and a second plane figure drawn in the xz plane. Each of the two plane figures is then extruded (i.e., geometrically projected) normal to its respective plane to form a solid figure of infinite extension. The intersection of the two extruded solid figures (i.e., the region of space shared between them) structurally defines the collection region.

Figure 11:
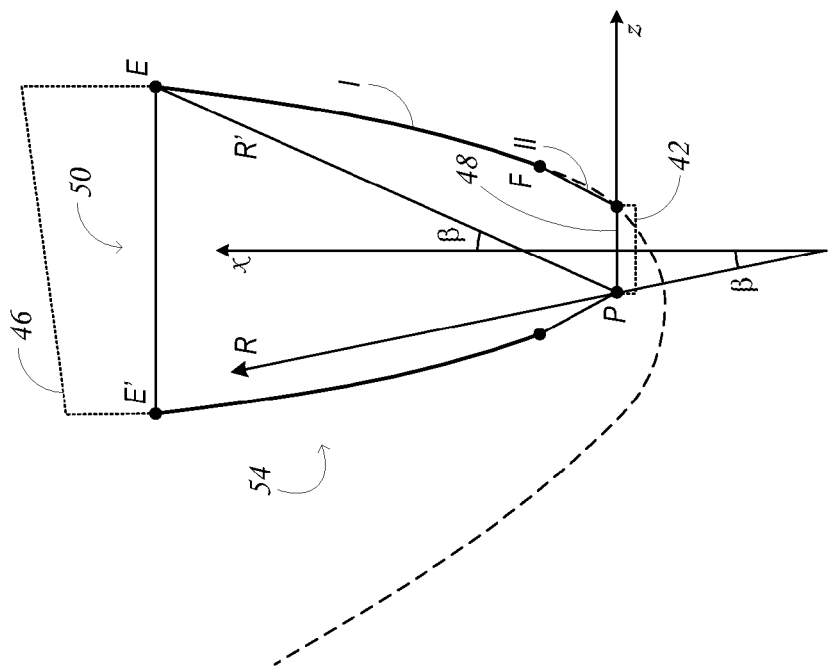
FIGS. 10 and 11 illustrate certain geometric aspects of a collection region of a light collector in accordance with an embodiment of the present disclosure.
Figure 10:
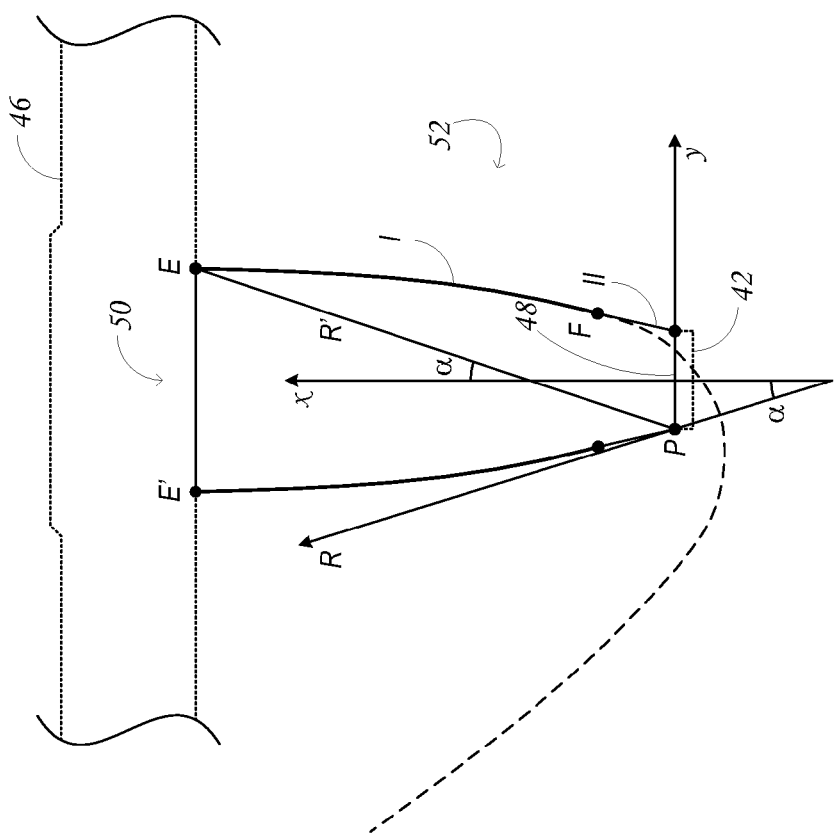

FIGS. 10 and 11 illustrate certain geometric aspects of collection region 44 in one example embodiment, and with particular reference to the plane figures on which the above description is based. In particular, FIG. 10 illustrates a first plane FIG. 52 drawn in the xy plane, and FIG. 11 illustrates a second plane FIG. 54 drawn in the xz plane.

As shown in FIG. 10, first plane FIG. 52 includes parabolic section I and linear section II. The parabolic section of the first plane figure may be constructed in the following manner.

Once the value of α is selected, a ray R is drawn from point P in the xy plane, where one edge of the entry aperture intersects the plane. The ray is drawn away from the LED and is rotated away from entry aperture 48 by an angle α relative to mechanical axis x. Ray R may now be used as an axis for constructing a section of a parabola having a focus located at P. The parabolic section I lies on the branch of the parabola disposed opposite point P and extends away from the entry aperture until it intersects ray R', which is the reflection of ray R in a plane orthogonal to the xy plane and parallel to the x axis. Thus, the intersection of ray R' with the parabola defines both the endpoint E of the parabolic section and one edge of exit aperture 42. The opposite edge of the exit aperture coincides with E'—a point to E by symmetry, viz., the points are reflections of each other in the plane orthogonal to xy and containing the mechanical axis x. It follows, therefore, that the value of the extreme ray angle α determines not only the size of exit aperture 42 but also the length of collection region 44 in the illustrated example.

In one embodiment, parabolic section I may extend all the way back to entry aperture 48. This configuration may provide good coupling between the source and the wedge in embodiments where emissive layer 42 is ideally flat. In other embodiments, however, where the emissive layer may have significant thickness, coupling efficiency may be improved by extending the parabolic section only part way to the entry aperture (to point F in FIG. 10). Linear section II is then provided to span the region from F to the entry aperture. The linear section may have a slope equal to the limiting slope of the parabolic section at point F.

As shown in FIG. 11, second plane FIG. 46 also includes a parabolic section I and a linear section II, which may be constructed as described for first plane FIG. 44, except that extreme ray angle β is used in place of extreme ray angle α.

It will be understood various different light-collector embodiments are embraced by the present disclosure, and that the particular dimensions of the light collector may be adapted specifically for each optical configuration in which the light collector is used. In one embodiment, however, where α is 17.22 degrees, and β is 11.60 degrees, entry aperture 48 may be 2.64 millimeters along the y axis and 1.92 millimeters along the z axis. Exit aperture 50 may be 9.63 millimeters along the y axis and 5.48 millimeters along the z axis. In first plane FIG. 52, linear section II may extend 1.81 millimeters from the entry aperture in the x direction, and in second plane FIG. 54, the linear section may extend 0.82 millimeters from the entry aperture in the x direction. Light collection region 44 may extend 9.00 millimeters in the x direction, and be disposed 5.30 millimeters from the illumination optic 30, with abutment region 46 filling the space between the collection region and the illumination optic.

In one embodiment, entry aperture 48 may conform to the dimensions of the emissive layer 42 of light source 28. In other embodiments, however, the entry aperture may be slightly larger than the light source in the y and/or z directions. Enlarging the entry aperture with respect to the light source may be advantageous in embodiments where assembly and/or manufacturing tolerances may result in imperfect alignment between emissive layer 42 and light collector 32.

In arriving at a suitable light collector configuration, the length of linear section II in the first or second plane figures and the dimensions of entry aperture 48 may be adjusted within appropriate limits. Such adjustment, however, may cause the light projected from the light collector to slightly overfill or slightly underfill the range of acceptance angles of the illumination optic. In FIG. 7, representative underfill (dot-dashed line) and overfill (dashed line) conditions are shown for comparison with the idealized profile (solid line). In general, underfilling the range of acceptance angles will result in inadequate illumination at the edge regions of the illumination optic, while overfilling will result in undesired stray reflections in the optical system.

In one embodiment, therefore, the length of linear section II in the first or second plane figures and the dimensions of entry aperture 48 may be configured to slightly overfill the range of acceptance angles of the illumination optic in the plane perpendicular to the central plane of the illumination optic. To eliminate undesired stray reflections, however, light collector 32 may include mode strippers 56 arranged exterior the bridging section of abutment region 46, as shown in FIGS. 8 and 9.

Figure 12:
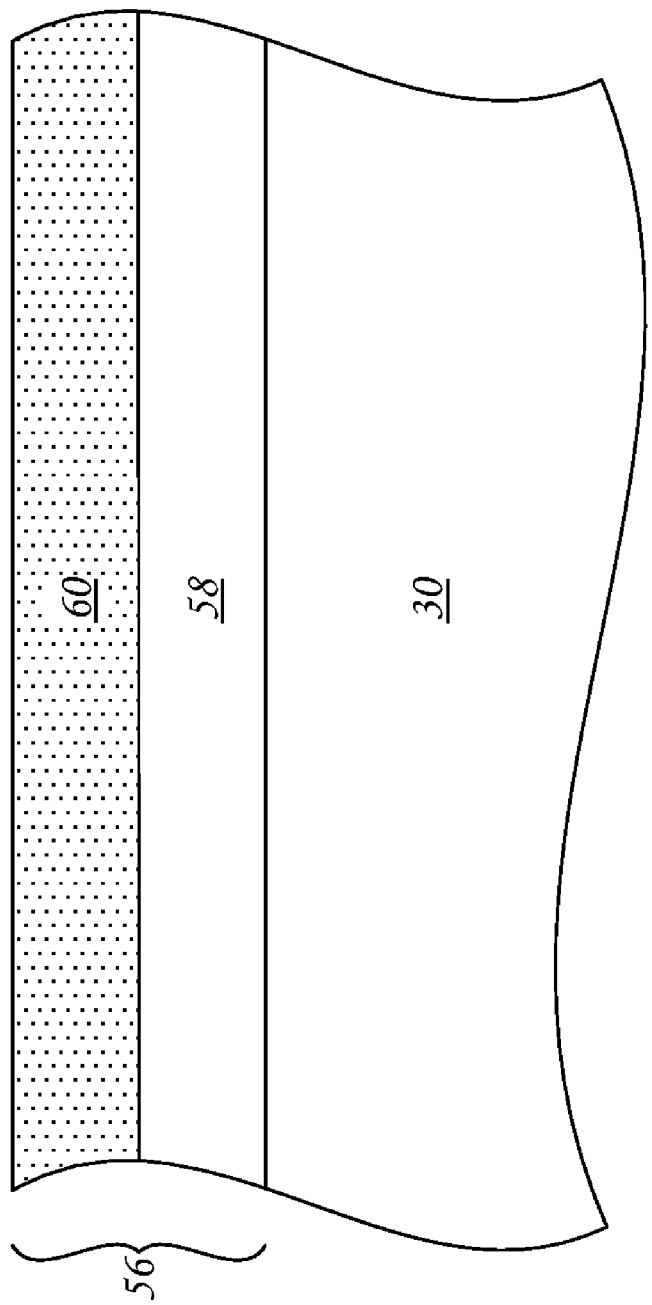
FIG. 12 illustrates a cross section of a mode stripper for a light collector in accordance with an embodiment of the present disclosure.

FIG. 12 illustrates a cross section of mode stripper 56 in one example embodiment. The mode stripper comprises cladding layer 58 and attenuating layer 60. The cladding layer of the mode stripper may be affixed directly and optically coupled to the abutment region of light collector 32; it may comprise a material having a refractive index less than that of the abutment region, and chosen such that light outside of the desired range of acceptance angles of the illumination optic leaks into and refracts through the cladding layer. Applied over the cladding layer is a higher-index attenuating layer. The attenuating layer may comprise a black dye, black particulates, etc., in a suitable amount so that any light refracting through the cladding layer is absorbed in the attenuating layer. In this manner, the overfilled profile may be trimmed upon transmission through the abutment region to better match the range of acceptance angles of the illumination optic. In one particular embodiment, the cladding layer of the mode stripper may comprise 'Norland Optical Adhesive 63', and the attenuating layer may comprise 'Black Kapton®', products of Norland Products, Inc. (Cranbury, N.J.) and E.I. du Pont de Nemours and Company (Wilmington, Del.).

Finally, it will be understood that the articles, systems and methods described herein are exemplary in nature, and that these specific embodiments or examples are not to be considered in a limiting sense, because numerous variations are contemplated. Accordingly, the present disclosure includes all novel and non-obvious combinations and sub-combinations of the various systems and methods disclosed herein, as well as any and all equivalents thereof.

The invention claimed is:

1. An optical system comprising:
    an illumination optic having an exit face, the illumination optic configured to admit light, and, for light admitted within a range of acceptance angles, to turn and collimate the admitted light, and to project the turned, collimated, admitted light from the exit face;
    a light source configured to emit light of a range of emission angles greater than the range of acceptance angles; and
    a light collector configured to converge the light from the light source down to the range of acceptance angles of the illumination optic, and to couple the converged light into the illumination optic, wherein the light collector is coupled to the illumination optic via an anti-reflective layer.

2. The optical system of claim 1, wherein the range of emission angles conforms to a substantially Lambertian emission profile.

3. The optical system of claim 1, wherein the light source comprises a white-light emitting diode.

4. The optical system of claim 1, wherein the range of acceptance angles is defined by a first extreme ray angle projected onto a first plane, and a second extreme ray angle projected onto a second plane orthogonal to the first plane, and wherein the first extreme ray angle is greater than the second extreme ray angle.

5. The optical system of claim 4, wherein a collection region of the light collector comprises a first mirror-image pair of opposing faces configured to converge the light from the light source to angles less than the first extreme ray angle.

6. The optical system of claim 5, wherein the collection region of the light collector comprises a second mirror-image pair of opposing faces configured to converge the light from the light source to angles less than the second extreme ray angle.

7. The optical system of claim 6, wherein at least one of the first and second mirror-image pairs of opposing faces includes a planar region.

8. The optical system of claim 1, wherein the light source is mechanically and optically coupled to the light collector.

9. The optical system of claim 5, wherein a substantially rectangular contacting area couples the light source to the light collector.

10. The optical system of claim 1, wherein the anti-reflective layer comprises at least one layer of an interference coating or a dichroic coating.

11. The optical system of claim 1, wherein the light collector is coupled to the illumination optic via at least one layer of an optically transparent gel.

12. The optical system of claim 1, further comprising an image-modulating layer configured to selectively transmit some of the light projected from the illumination optic as an image formed on an image area.

13. The optical system of claim 12, further comprising a computer operatively coupled to the image-modulating layer and to the light source, and configured to control the image formed on the image area.

14. The optical system of claim 13, wherein the image area includes a keyboard area.

15. The optical system of claim 14, wherein the keyboard area includes one or more depressible keys.

16. A light collector configured to couple light from a light source into an illumination optic, the illumination optic configured to project light admitted below a first extreme ray angle projected onto a first plane, and below a second, smaller extreme ray angle projected onto a second plane orthogonal to the first plane, the light collector comprising:

a collection region comprising first and second mirror-image pairs of opposing faces, wherein each face includes a curved region and a planar region, the first pair configured to converge light from a light source to angles less than the first extreme ray angle, and the second pair configured to converge the light from the light source to angles less than the second extreme ray angle;

an abutment region configured to couple mechanically to the illumination optic, and to transmit light from the collection region to the illumination optic; and a mode stripper affixed and optically coupled to the abutment region, the mode stripper configured to refract light outside of a desired range of acceptance angles.

17. The light collector of claim 16 further comprising a cladding layer arranged over the abutment region and an attenuating layer arranged over the cladding layer, wherein the cladding layer has a lower refractive index than the abutment region, and the attenuating layer comprises light-attenuating matter configured to absorb light that has refracted out of the abutment region and through the cladding layer.

18. The light collector of claim 17, wherein the attenuating layer comprises a black dye or a black particulate.

19. An illumination optic configured to admit light of a range of emission angles from a light source, the illumination optic comprising:

a pair of opposing, substantially planar faces defining a wedge-shaped region and including an exit face, the wedge-shaped region configured to turn, collimate and project from the exit face light admitted to the wedge-shaped region within a range of acceptance angles smaller than the range of emission angles; and a collection region sharing with the wedge-shaped region a common, continuous material phase and comprising first and second mirror-image pairs of opposing faces, wherein each face includes a curved region and a planar region, the collection region configured to converge the light from the light source to within the range of acceptance angles.

20. The illumination optic of claim 19, wherein the common, continuous material phase comprises one or more of acrylic and polycarbonate.

* * * * *

UNITED STATES PATENT AND TRADEMARK OFFICE
CERTIFICATE OF CORRECTION

| | | |
|---|---|---|
| PATENT NO. | : 8,029,181 B2 | Page 1 of 1 |
| APPLICATION NO. | : 12/948627 | |
| DATED | : October 4, 2011 | |
| INVENTOR(S) | : Adrian Travis et al. | |

It is certified that error appears in the above-identified patent and that said Letters Patent is hereby corrected as shown below:

In column 9, line 14, in Claim 7, delete "minor-image" and insert -- mirror-image --, therefor.

Signed and Sealed this
Twenty-ninth Day of November, 2011

David J. Kappos
*Director of the United States Patent and Trademark Office*